June 8, 1926.

F. E. BRONK ET AL 1,587,894

DRIVE MECHANISM

Filed June 28, 1920

Inventors
Fay E. Bronk
George R. Fessenden
by their attorney
Farnum F. Worsey

Patented June 8, 1926.

1,587,894

UNITED STATES PATENT OFFICE.

FAY E. BRONK AND GEORGE R. FESSENDEN, OF ROCHESTER, NEW YORK, ASSIGNORS TO NORTH EAST ELECTRIC COMPANY, OF ROCHESTER, NEW YORK, A CORPORATION OF NEW YORK.

DRIVE MECHANISM.

Application filed June 28, 1920. Serial No. 392,327.

This invention relates to drive-mechanism adapted for connecting and disconnecting a rotary member or drive-shaft with rotary driven members of various forms and sizes.

In testing dynamo-electric machines and the like it is usual to mount the machine to be tested on a temporary support in alignment with a drive-shaft, which is rotated by suitable power-mechanism, and to connect the drive-shaft with the armature-shaft of the electric machine by a coupling of some convenient form. In such coupling it is desirable to provide both for convenience in connecting and disconnecting the parts in question, and also to accommodate the mechanism to such inaccuracies as may occur in the alignment of the two shafts. The object of the present invention is to produce a driving-connection which will secure these advantages in a simple and effective manner.

To the foregoing end it is proposed to combine, in a unitary structure, one member of a flexible positive coupling with a jaw-chuck, this unitary structure cooperating, on the one hand, with the other member of the coupling, and on the other hand with the armature-shaft or other rotary member of the machine which is to be tested. The invention includes, further, the use of a spring in the manner hereinafter described, to prevent retention of the connecting-member in engagement with the drive-shaft when the connecting-member is not in use.

Figure 1:
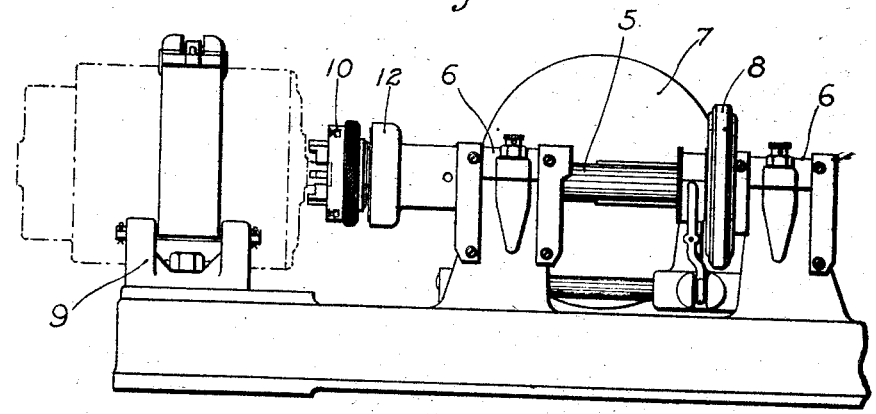
Figure 2:
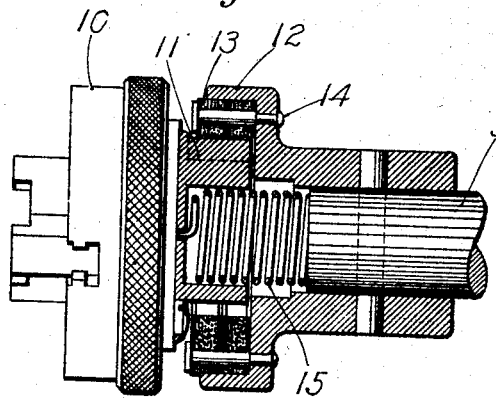
Figure 3:
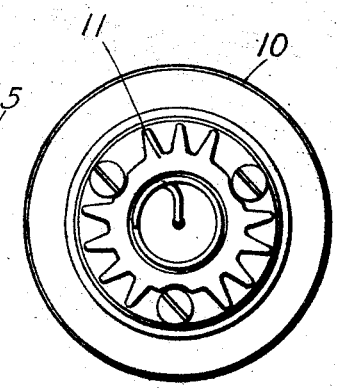

In the accompanaying drawings Fig. 1 is a front-elevation of a testing-machine equipped with connecting-mechanism embodying the present invention. Fig. 2 is a side-elevation of the connecting-mechanism, on a larger scale than Fig. 1 and partly in vertical section; and Fig. 3 is a right-hand end-elevation of the combined chuck and coupling-member.

The invention is illustrated as embodied in a testing-machine in which a horizontal drive-shaft 5 turns in bearings 6 and is driven, at variable speed, by cooperating friction-wheels 7 and 8 in a well-known manner. This drive-shaft is used to actuate the armature of the dynamo-electric machine which is to be tested, this machine being temporarily secured upon a cradle 9 in the position shown in broken lines in Fig. 1.

As shown particularly in Fig. 1, connection may be made directly with the armature-shaft of the dynamo-electric machine by means of a jaw-chuck 10. This chuck is or may be of any ordinary or well-known construction, preferably of the type known as a scroll-chuck or universal chuck having three jaws as shown. This device has the advantage that it may be adjusted to receive shafts of different diameters or to engage equally well with gear-pinions or sprocket-wheels on the shafts of the machines to be tested.

Secured to the back of the chuck, and concentric therewith, is a part 11 which constitutes one member of a well-known form of flexible positive coupling. This member is provided with radial projections or teeth, as shown in Fig. 3, which engage loosely with corresponding recesses in the cooperating coupling-member. These recesses are formed in a body of flexible material 13, such as leather and fibre, secured by means of rivets 14 within a cup-shaped head 12. The head 12 is fixed to the end of the drive-shaft 5 so as to be rotated thereby. The parts of the coupling are fitted together with sufficient looseness to permit the device to accommodate itself to inaccuracies in the alignment of the drive-shaft and the driven member, while the yielding material 13 prevents unnecessary noise and vibration in the operation of the device.

When a dynamo-electric machine is to be placed on the cradle 9 the connecting-member, comprising the clutch 10 and the coupling-member 11, is first secured to the armature-shaft by closing the chuck 10 upon it, and the machine is then placed upon the cradle and moved towards the drive-shaft 5 so as to engage the coupling-members 11 and 13.

When the connecting-member is not in use it should be removed from the drive-shaft, for otherwise, if the shaft should be rotated the connecting-member might be thrown off from the shaft with some violence owing to centrifugal force. To insure that the connecting-member shall never remain upon the drive-shaft when not in use a spring 15 is attached, at one end, to the connecting-member and projects therefrom in a direction to engage the end of the shaft 5. When there is no machine on the seat 9 to hold the connecting-member in place the spring forces the coupling-member 11 out of engagement with the other coupling-member, thus insuring the desired result.

While the invention is particularly useful in connection with a testing-machine for the purpose referred to, it will be apparent that it may have other uses, and that it is not, in general, limited to the details of construction of the embodiment thereof hereinbefore described.

The invention claimed is:

1. Drive-mechanism comprising: a rotary power-member; a jaw-chuck; positive coupling-members fixed, respectively, to the power-member and the jaw-chuck and loosely engageable and freely separable; and a spring tending to separate the coupling-members.

2. The combination, with a drive-shaft and with means for supporting a dynamo-electric machine with its armature-shaft substantially in alinement with said drive-shaft, of means for connecting said shafts temporarily together, comprising: a jaw-chuck adapted to be secured to the armature-shaft; and positive coupling-members fixed, respectively, to the chuck and the drive-shaft, said coupling-members being loosely engaged when the mechanism is in operation but free for separation axially when the dynamo-electric machine is removed from its support.

3. The combination of claim 2, with the addition of a spring interposed between the coupling-members, attached to one of them and tending constantly to cause their axial separation.

FAY E. BRONK.
GEORGE R. FESSENDEN.